Figure 1:
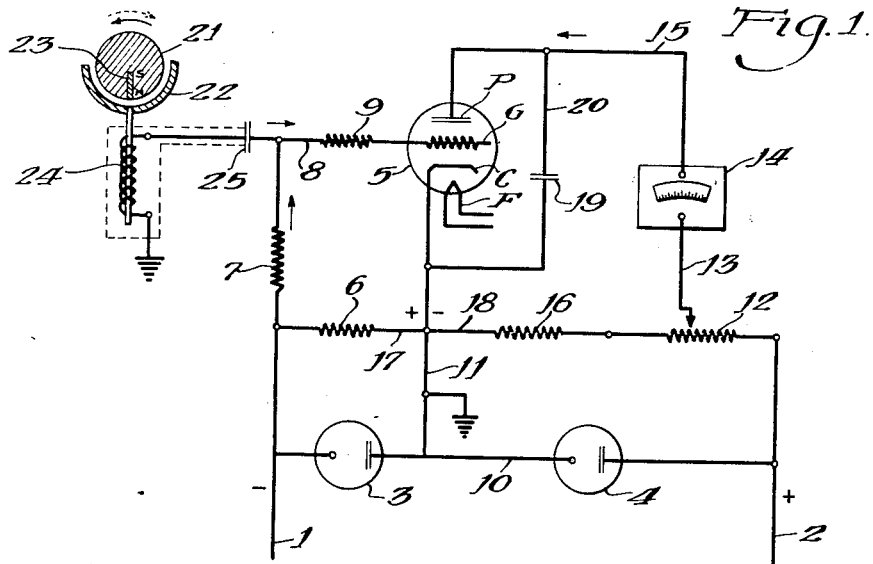

July 10, 1951     B. L. COVERT     2,559,849

ELECTRONIC SPEED INDICATOR

Filed June 28, 1947

INVENTOR.
Benjamin L. Covert
BY
Maynard P. Venema
Attorney

Patented July 10, 1951

2,559,849

UNITED STATES PATENT OFFICE 2,559,849

ELECTRONIC SPEED INDICATOR

Benjamin L. Covert, Chicago, Ill., assignor to Universal Oil Products Company, Chicago, Ill., a corporation of Delaware Application June 28, 1947, Serial No. 757,767

2 Claims. (Cl. 175—183)

This invention relates to an improved type of speed indicating apparatus particularly adapted for recording the speed of an enclosed moving member, which cannot be reached with the usual types of counters or mechanical metering devices.

There are many types of apparatus which have their operating or moving parts entirely enclosed. For example, a variable speed engine or turbine, or mechanical apparatus such as mixers and the like, may have an entirely enclosed rotating shaft, reciprocating member, or other moving part, the speed of which it is necessary, or desired, to ascertain. One specific advantageous use of the improved speed measuring device of the present invention may be illustrated by its use with an electrical induction motor stirrer or mixer, in which the rotor of the motor, the shaft, and the mixing blade are all enclosed within a pressure tight housing. The so-called "induction stirrers" are frequently used in chemical processes or in laboratory research work where the mixing speed must be known or controlled. Prior to the use of the present apparatus, there had not been any way of satisfactorily measuring the R. P. M. of apparatus of this type, particularly where the shaft member is enclosed in a pressure tight chamber or within a long bearing or close fitting housing.

It is therefore a principal object of the present invention to provide an improved type of speed indicating apparatus.

It is also an object of the present invention to make use of an electronic circuit and magnetic pick-up means in association therewith, in order to provide a speed indicating apparatus which gives a direct visual indication of the speed of a totally enclosed moving member.

Briefly, the apparatus comprises in combination an electronic circuit and magnetic means for producing voltage impulses to the circuit, the electronic circuit having a source of constant voltage electrical power, an electron discharge tube, a current measuring meter, capacitance, and suitable resistances and capacitances within said circuit providing potentials to the electron discharge tube, making it normally inoperative, magnetic means associated with the discharge tube in a manner firing the tube for each voltage impulse received, and with the current meter connecting to the discharge tube in a manner to measure the current passing therethrough, whereby the meter reading provides a measure of the rate of the tube firing and the rate of movement of the moving member, the speed of which is to be measured.

In a more specific embodiment of the apparatus, a small bar magnet adapted for mounting on the moving member and an electromagnetic pick-up connecting with the grid of the electron discharge tube provides the voltage impulse from the moving member and the magnet to control the tube firing and to in turn effect a visual current measurement on the current meter, the current measuring meter being calibrated to indicate directly and visually the speed of the moving part to which the apparatus is attached.

There are several advantages to the present invention, in addition to the fact that it may be used in connection with machines and apparatus having generally inaccessible moving parts, or totally enclosed moving members. The current meter, after calibration, furnishes a direct visual reading of the speed of the moving member, since the current passing through the control tube increases almost directly with the rate of the tube firing and the corresponding rate of impulses passing to the tube by way of the electromagnetic pick-up means. The use of a small bar magnet and the magnetic pick-up is also an advantageous feature in that it provides the impulse to the magnetic pick-up and other than for the mounting of this small magnet, it is not necessary to connect directly to any moving member. The bar magnet may be mounted on or within the enclosed member, as will be subsequently described in further detail, while the end of the electromagnetic pick-up is positioned externally of the housing and is operative to receive an impulse from the nearest magnetic pole of the bar magnet for each passing of the latter.

In using the apparatus with an enclosed shaft, a hole may be drilled directly therein and the small bar magnet placed within it, such that for each revolution of the shaft, the outer pole of the magnet passes the externally positioned magnetic pick-up and causes a small voltage impulse to be passed therefrom to the control grid of the electron discharge tube and permit a firing of the latter. Where a reciprocating member or other type of moving part is involved, the bar magnet may be mounted directly on it, within the housing, and in like manner an adjacently mounted magnetic pick-up will pass the impulses to the electron tube and cause the firing of the latter for each voltage impulse received, such that the current meter reading provides a measurement of the rate of speed of the moving member.

The accompanying diagrammatic drawing will serve to more clearly illustrate the apparatus of this invention and its operation in measuring the speed of a moving member which is normally inaccessible for a direct measurement.

Figure 1 of the drawing illustrates diagrammatically, one embodiment of the improved apparatus and its operation in connection with a rotating shaft.

Figure 2:
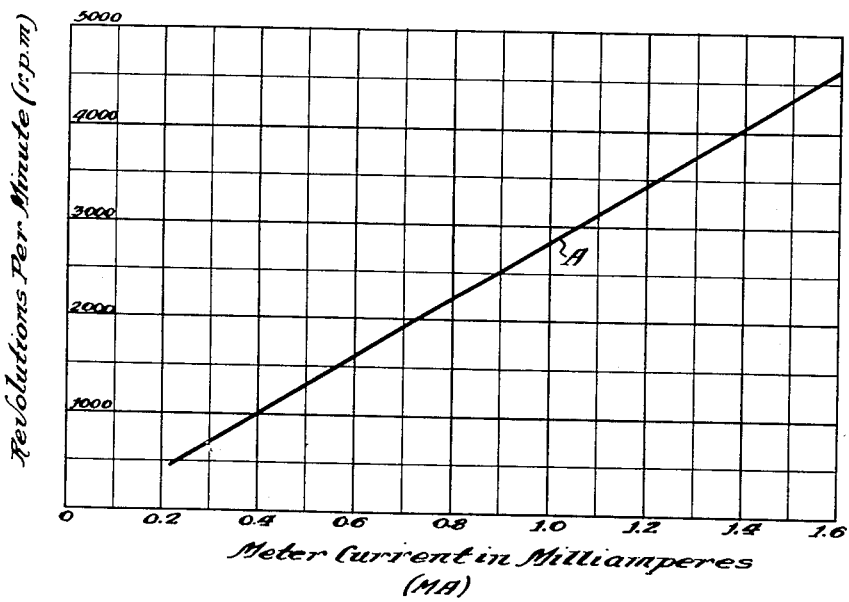

Figure 2 of the drawing shows a chart indicating how the current measuring meter may be calibrated to provide a direct reading of the revolutions per minute of a rotating member, such as the totally enclosed shaft illustrated in Figure 1.

In the electronic circuit of the apparatus, as shown in Figure 1 of the drawing, rectified and filtered electric power is supplied by way of lines 1 and 2, the voltage being controlled in the circuit by the voltage regulating tubes 3 and 4. The regulating tubes are necessary to supply the electron discharge tube 5, or thyratron, with a substantially constant voltage, since the tube is used in the circuit as the principal control member and line voltage surges may effect its operation in an undesirable manner.

The grid bias supply carries through line 1, resistance 7, line 8 and resistance 9 to the grid G of the thyratron 5. The size and capacity of the resistors are such as to furnish the desired voltage supply to the grid G, of course more than one resistor may be used at the various points, the drawing being diagrammatic only. The neutral lines 10 and 11, between the voltage regulating tubes 3 and 4, are grounded, while the line 11 connects directly to the cathode C of the tube 5. The plate potential is supplied through line 2, adjustable resistance or potential divider 12, line 13, current meter 14, and the line 15, the latter line connecting directly to the anode or plate P of the thyratron 5. The resistances 6 and 16, in lines 17 and 18 respectively, and which connect with the neutral line 11, are placed in a manner to control and limit the voltage being supplied within each of the circuits of the electrical system.

The condenser 19, in line 20, is placed in a manner to shunt the plate circuit passing through the thyratron tube 5, the charging and discharging of this condenser or capacitor 19 being controlled by the firing of the tube 5. The filament F of the tube 5 is provided with a suitable voltage and current supply as required for the particular thyratron or electron discharge tube which is employed within the circuit.

One of the features of the present improved device and its operation is the method of using a small bar magnet in combination with an electromagnetic pick-up, and thereby providing the voltage pulsations to the grid of the tube 5 in a manner to cause the latter to discharge or fire. The bar magnet is attached or placed within the moving member, the speed of which is to be measured. In the particular embodiment illustrated, a rotating shaft 21, enclosed by a housing 22, has a small bar magnet 23 mounted therein with the north pole at the outer periphery at the shaft 21. Of course, where the shaft is in a very close fitting housing or bearing, the end of the bar magnet is necessarily slightly recessed so that it does not touch the housing as the shaft rotates. An electromagnetic pick-up 24, having an iron core and a surrounding coil is mounted in a manner to be in contact with or adjacent to the housing 22 and in the same plane as the bar magnet 23, such that it may pick up voltage impulses from the latter. One end of the coil of the magnetic pick-up 24 is grounded while the other end connects directly to a capacitor 25 in line 8, which in turn connects with the grid G of the thyratron 2. The capacitor 25 is necessary to prevent the direct current voltage passing to the grid from entering the magnetic pick-up. Suitable shielding is also provided around the pick-up circuit to insure that stray voltages will not be picked up and carried to the grid and interfere with the proper operation of the apparatus.

In the operation of the circuits of the apparatus, the plate circuit and the normal grid bias circuit are adjusted in a manner to just keep the thyratron from firing, thus, when a pulse voltage is picked up and passed to the grid G the thyratron tube is fired, shorting out the condenser 19 and discharging it, such that current is drawn through the meter 14. Instantaneously after the pulse voltage is passed, the tube returns to its normal operating condition which allows the condenser 19 to be charged up from the voltage source, through lines 15 and 11, and the tube is then ready for the next pulse.

Each pulse from the magnetic pick-up 24 thus fires the tube 5 and is registered at the meter 14, in that the greater the number of pulses and the number of times the tube is fired, the greater the current passing through the tube and the higher the meter will read. The meter reading is substantially directly proportional to the rate of firing and to the speed of the member being measured. Therefore, when the current readings of the milliampere scale of the current meter 14 are properly calibrated, the speed of the moving member may be read directly therefrom.

Figure 2 of the drawing illustrates one example of charting or calibrating the current meter, such that the readings provide a direct visual indication of the speed of a shaft or other rotating member, such as shaft 21 in Figure 1 of the drawing. The calibration of the meter may be made in a usual manner, the particular meter and apparatus being employed with rotating shafts or members the speeds of which are known, or with a variable speed apparatus which can be operated at known speeds. However, when once the apparatus is calibrated for a rotating member, or other given type of movement, with the magnetic bar mounted on the part in a manner to issue the necessary impulses to the magnetic pick-up and the control tube, then the apparatus is ready for operation and is usable without further adjustment.

The chart of Figure 2 provides a horizontal scale, reading in milliamperes (ma.), and a vertical scale reading in revolutions per minute, while the line A determined by the calibration of the current meter 14 is indicated by the diagonal substantially straight line thereon. The particular current meter of one embodiment of the apparatus as indicated in Figure 2, is suitable for furnishing readings from about 300 R. P. M. to about 4500 R. P. M. Of course, by changing the component parts in the circuit, it is possible to obtain other current readings higher or lower and correspondingly higher or lower ranges of speed readings.

In using the speed measuring device with some types of moving parts in various machines and forms of apparatus, it may be found unnecessary to use the small bar magnet for producing the voltage impulses to the magnetic pick-up. For example some moving parts may have suitable projections which would produce an impulse to a pick-up and operate the circuit in a satisfactory manner. In still other instances, such as in measuring the speed of an enclosed member having a particularly thick or heavy housing, it may be necessary to provide an amplifying stage ahead of the thyratron tube in order to effect a voltage pulsation to the control grid which will satisfactorily fire the tube and operate the speed measuring apparatus.

While the aforegoing description has been directed particularly to measuring the speed of enclosed moving members, it is not intended to limit the use of the apparatus to such measurements, as obviously the improved apparatus may be satisfactorily used in measuring the rate of speed of exposed moving members of all types and of all forms of movement, whether the latter be rotating, reciprocating or linear.

I claim as my invention:

1. Apparatus for indicating the speed of an enclosed rotating member, comprising in combination, a small bar magnet embedded below the surface of said enclosed rotating member, an electromagnetic pick-up positioned externally of the enclosure surrounding said rotating member in a manner opposing said bar magnet, and an electronic circuit connecting with said magnetic pick-up, said circuit including a source of electrical power, voltage regulating tubes, a suitable electrical condenser, a current indicating meter, an electronic discharge tube having a plate, cathode, and a control grid, an adjustable resistor and suitable fixed regulating resistances and capacitances within said circuit rendering said tube normally inoperative, said electrical power supply connecting through regulating resistors to the control grid of said discharge tube and through said adjustable resistor and said current meter to the plate of said discharge tube in a manner providing respectively the grid bias and the plate voltage supply, a grounded neutral line connecting said voltage regulating tubes with the cathode of said discharge tube, said condenser connecting across the plate of said discharge tube and said discharge tube between said neutral line to said cathode, said electromagnetic pick-up grounded on one side and connecting on the other side through a regulating capacitor to said grid of said tube whereby the latter is fired for each voltage impulse passed thereto, and said current meter connects between said adjustable resistor and the plate of said tube within said circuit, whereby the current passing therethrough provides a direct indication of the rate of the tube firing and the speed of said enclosed rotating member.

2. The apparatus of claim 1 further characterized in that said current meter is a calibrated ammeter providing a direct visual indication of the speed of the enclosed rotating member.

BENJAMIN L. COVERT.

REFERENCES CITED

The following references are of record in the file of this patent:

UNITED STATES PATENTS

| Number | Name | Date |
|---|---|---|
| 1,804,168 | Keller | May 5, 1931 |
| 1,846,678 | Ferrell | Feb. 23, 1932 |
| 2,226,185 | Sturm et al. | Dec. 24, 1940 |
| 2,232,959 | Miller | Feb. 25, 1941 |
| 2,332,773 | Barnette et al. | Oct. 26, 1943 |
| 2,333,210 | Stern | Nov. 2, 1943 |